(12) United States Patent
Neill (10) Patent No.: US 12,070,883 B2
(45) Date of Patent: Aug. 27, 2024

(54) MOLD LOCKING ASSEMBLY

(71) Applicant: Toyota Motor Engineering & Manufacturing North America, Inc., Plano, TX (US)

(72) Inventor: Jesse J. M. Neill, Atwood (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 18/096,218

(22) Filed: Jan. 12, 2023

(65) Prior Publication Data
US 2024/0239031 A1 Jul. 18, 2024

(51) Int. Cl.
*B29C 45/84* (2006.01)

(52) U.S. Cl.
CPC .................... *B29C 45/84* (2013.01)

(58) Field of Classification Search
CPC .................................... B29C 45/84
USPC ........................................ 425/153
See application file for complete search history.

(56) References Cited

U.S. PATENT DOCUMENTS

| | | | |
|---|---|---|---|
| 4,355,945 A | 10/1982 | Pilch | |
| 4,655,275 A * | 4/1987 | Worner | B29C 33/305 425/190 |
| 5,114,330 A * | 5/1992 | Nielsen | B29C 31/006 425/193 |
| 5,562,935 A | 10/1996 | Martin | |
| 5,580,587 A * | 12/1996 | Leonhartsberger | B29C 45/1756 425/185 |
| 6,220,848 B1 | 4/2001 | Kaselow et al. | |
| 6,802,704 B2 | 10/2004 | Steil et al. | |

FOREIGN PATENT DOCUMENTS

| | | | | |
|---|---|---|---|---|
| CN | 212554907 U | * | 2/2021 | |
| GB | 2470285 A | * | 11/2010 | ......... B29C 45/2602 |
| WO | WO-9500714 A1 | * | 1/1995 | ............ E02F 3/3618 |

OTHER PUBLICATIONS

Machine translation CN212554907U (Year: 2021).*

* cited by examiner

*Primary Examiner* — Jacob T Minskey
*Assistant Examiner* — Wayne K. Swier
(74) *Attorney, Agent, or Firm* — Christopher G. Darrow; Darrow Mustafa PC (57) ABSTRACT

A mold locking assembly includes a mold set with a first mold and a second mold adjacent the first mold, a catch plate rigidly attached to the first mold, and a base plate rigidly attached to the second mold. The base plate includes a pair of posts spaced apart from each other and extending from a base portion of the base plate in a normal direction. An L-shaped latch arm pivotally attached to the pair of posts is included and the L-shaped latch arm is configured to engage the catch plate and hold the first mold adjacent to the second mold.

20 Claims, 8 Drawing Sheets

MOLD LOCKING ASSEMBLY

TECHNICAL FIELD

The present disclosure relates to locking assemblies, and particularly to locking assemblies for molds used during injection molding.

BACKGROUND

An injection molding machine provides high-volume manufacturing of parts by rapidly injecting molten plastic resin into a mold cavity formed between at least two molds (a mold set), cooling the injected molten plastic resin to form a solid part, and ejecting the solid part from between the mold set. In addition, after a production run of injection molding a given part is completed, the mold set is replaced with another mold set such that a production run of injection molding a different part can begin. However, replacement or changing of mold sets takes time and decreases the overall efficiency of the injection molding machine.

The present disclosure addresses issues related to the replacing or changing a mold set of an injection molding machine and other issues related to injection molding.

SUMMARY

This section provides a general summary of the disclosure and is not a comprehensive disclosure of its full scope or all of its features.

In one form of the present disclosure, a mold locking assembly a catch plate rigidly attached to a first mold of a mold assembly (mold set), a base plate rigidly attached to a second mold of the mold set, and an L-shaped latch arm pivotally attached to the base plate such that the L-shaped latch arm engages the catch plate and holds the first mold adjacent to the second mold.

In another form of the present disclosure, a mold locking assembly a catch plate rigidly attached to a first mold of a mold set, a base plate rigidly attached to a second mold, and an L-shaped latch arm pivotally attached to the base plate and configured to engage the catch plate and hold the first mold adjacent to the second mold. In some variations, a pneumatic actuator with an actuator piston is included and the pneumatic actuator is rigidly attached to the base plate and configured to engage and move the L-shaped latch arm between a locked position and an unlocked position.

In still another form of the present disclosure, a mold locking assembly includes a mold set with a first mold and a second mold adjacent the first mold, a catch plate rigidly attached to the first mold, and a base plate rigidly attached to the second mold. The base plate includes a pair of posts spaced apart from each other and extending from a base portion of the base plate in a normal direction. An L-shaped latch arm pivotally attached to the pair of posts is included and the L-shaped latch arm is configured to engage the catch plate and hold the first mold adjacent to the second mold. In some variations, an actuator mounting plate with an actuator access aperture is included and rigidly attached to the pair of posts, and in such variations a pneumatic actuator with an actuator piston can be included and be rigidly attached to an outward facing surface of the actuator mounting plate. And the pneumatic actuator is configured to engage and move the L-shaped latch arm between a locked position and an unlocked position.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, devices, and systems among those of the present technology, for the purpose of the description of certain aspects. The figures may not precisely reflect the characteristics of any given aspect and are not necessarily intended to define or limit specific forms or variations within the scope of this technology.

DETAILED DESCRIPTION

The present disclosure provides a mold locking assembly for use during changing mold sets of injection molding machine. Stated differently, the mold locking assembly locks or securely attaches two molds of a mold set to each other before the molds are removed from and/or installed in an injection molding machine. As used herein, the phrase "mold set" refers to a mold assembly with at least two molds that when used or installed in an injection molding machine, define a cavity (also known as a "mold cavity") into which molten thermoplastic material is injected in order to form a part with a shape complimentary to a shape of the cavity.

The mold locking assembly includes a catch plate that rigidly attaches to a first mold of a mold set, a base plate that rigidly attaches to a second mold of the mold set, and an L-shaped latch arm that engages the catch plate and holds or locks the first mold adjacent to and/or against the second mold. The L-shaped latch arm is pivotally attached to the baseplate, and in some variations, a pneumatic actuator rigidly attached to the base plate and configured to engage the L-shaped latch arm is included.

Figure 1A:
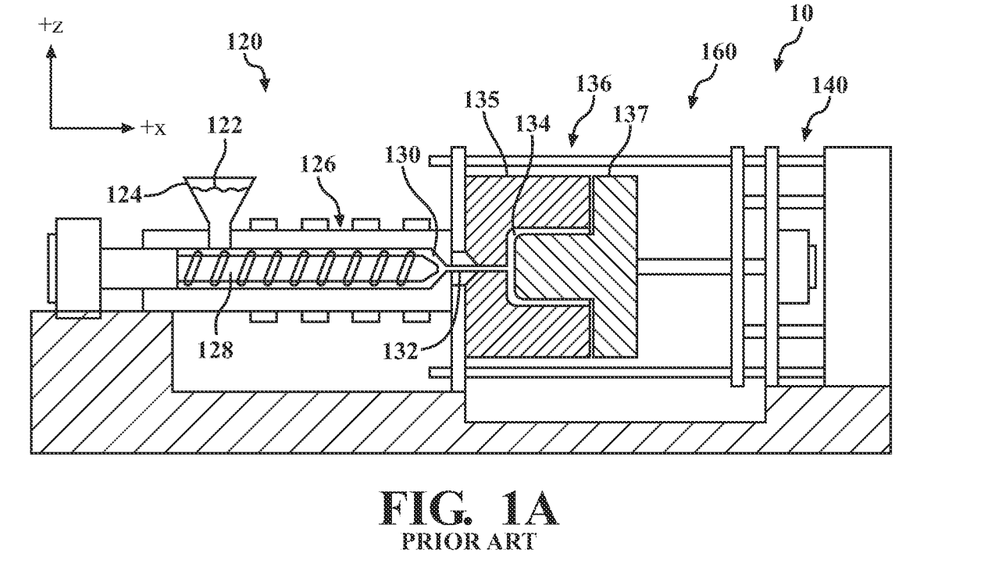
FIG. 1A shows a side cross-section view of an injection molding machine with a mold assembly (mold set) in a closed position during injection molding of a part.
Figure 1B:
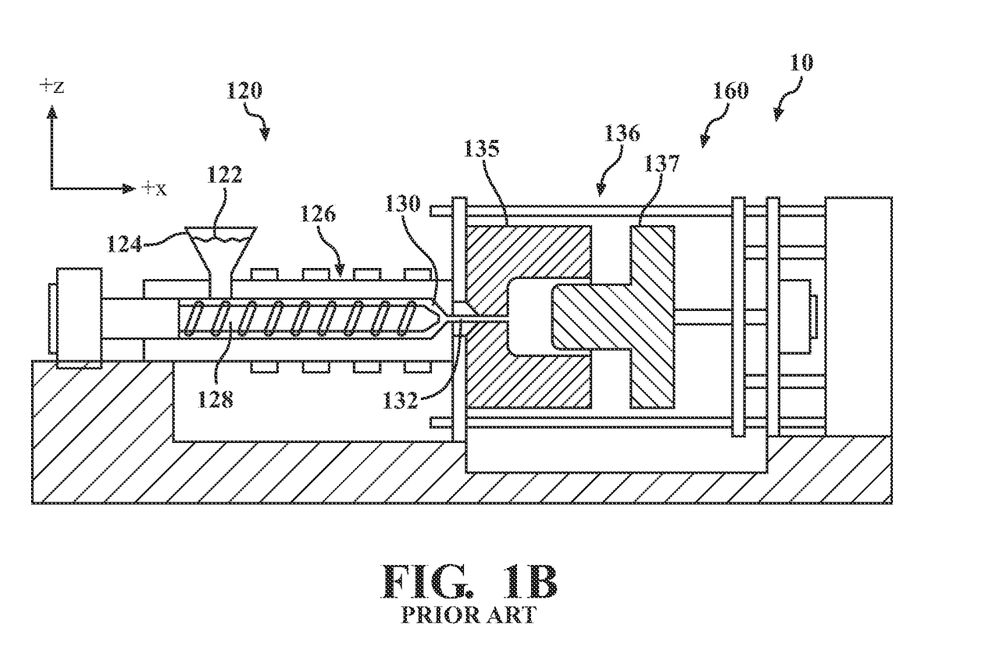
FIG. 1B shows a side cross-section view of the injection molding machine in FIG. 1A with the mold set in an open position.

Referring to FIGS. 1A-1B, one non-limiting example of an injection molding machine 10 is shown. The injection molding machine 10 includes an injection system 120 and a clamping system 160. Thermoplastic pellets 122 are introduced or fed into the injection system 120 via a hopper 124, which feeds the thermoplastic pellets 122 into a heated barrel 126. The thermoplastic pellets 122, after being fed into the heated barrel 126, progress towards a nozzle 132 at the end of the heated barrel 126 by rotation of a reciprocating screw 128, and heat from the heated barrel 126 and compression by the reciprocating screw 128 melt the thermoplastic pellets 122 to form a molten thermoplastic material 130.

An injection molding cycle to produce a part includes forcing the molten thermoplastic material 130 toward the nozzle 132 (material using the reciprocating screw 128) to form a "shot" of the molten thermoplastic material 130, and injecting the shot of molten thermoplastic material 130 through the nozzle 132 and into a mold cavity 134 (FIG. 1A) between a first mold 135 and a second mold 137 of a mold set 136. The molten thermoplastic material 130 is held together under pressure by a press or clamping unit 140, takes the form (shape) of the mold cavity 134, and cools to form a solid part. The press or clamping unit 140 then releases the mold set 136, the first and second molds 135, 137 are separated from one another (FIG. 1B), and the part is ejected from the mold set 136 such that the injection molding cycle can begin again and another part can be formed.

After a desired number of parts are formed or manufactured with the mold set 136, i.e., a production run is completed, the mold set 136 is removed and replaced with a different mold set for another production run to manufacture a different part (i.e., a part with a different shape). In addition, and given that typical cycle times for injection molding of parts range between about 2 seconds to about 2 minutes, time required to change a mold set results in a production loss of hundreds if not thousands of parts. Accordingly, reducing the time to exchange a mold set with another mold set is desirable.

Figure 2A:
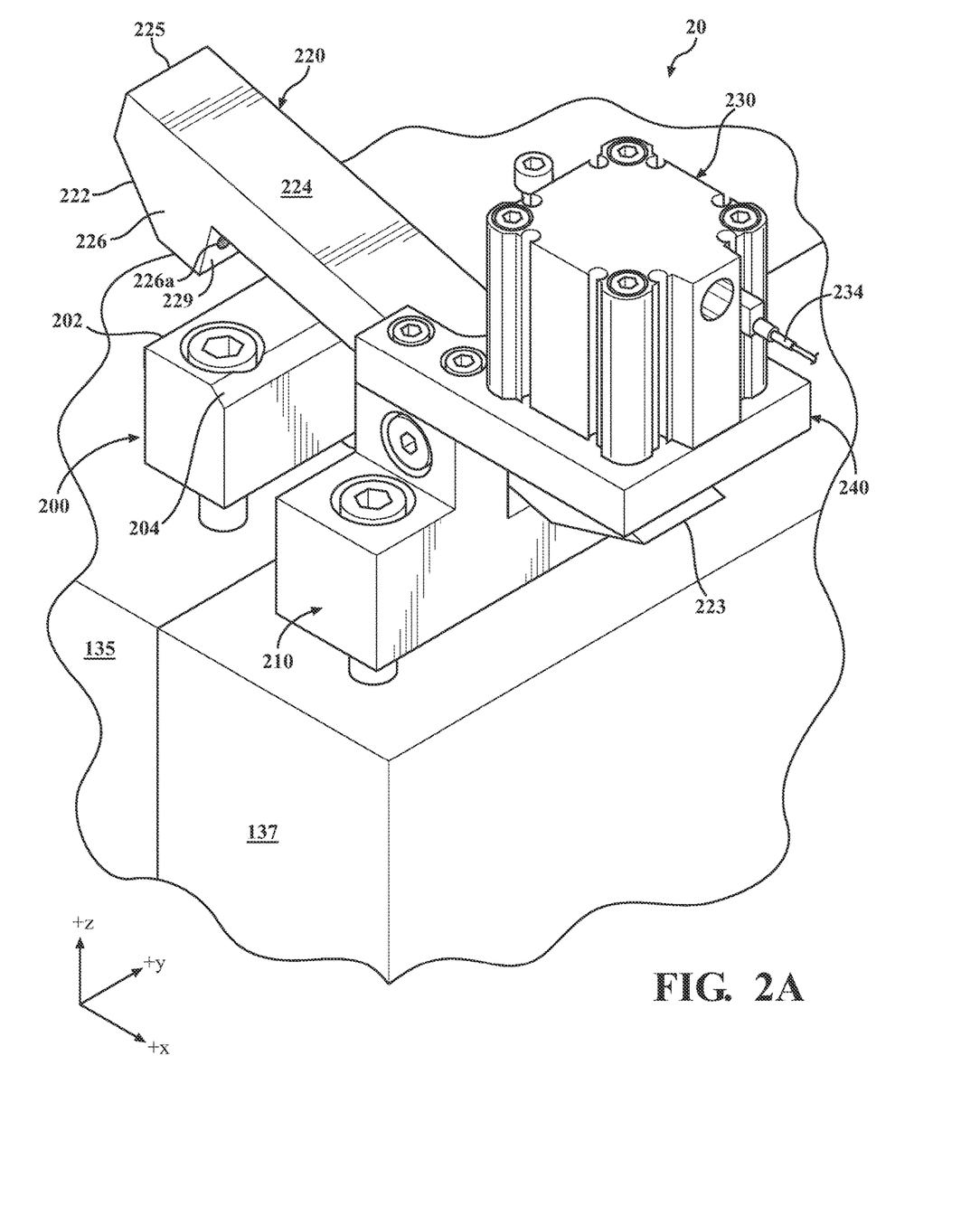
FIG. 2A shows a perspective view of a mold locking assembly according to the teachings of the present disclosure.
Figure 2B:
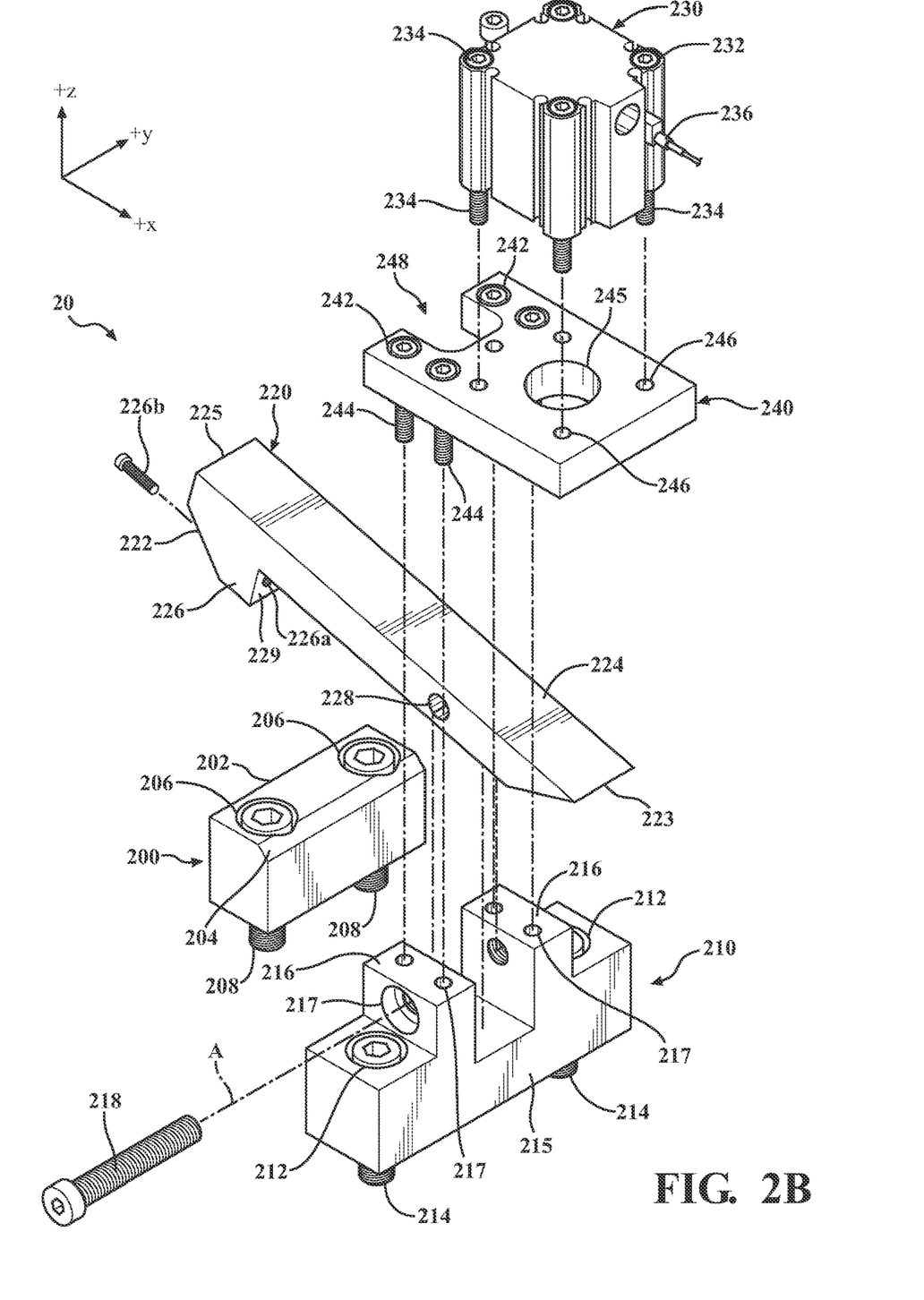
FIG. 2B shows an exploded view of the mold locking assembly in FIG. 2A.

Referring now to FIGS. 2A-2B, a perspective view of a mold locking assembly 20 to enhance exchanging a mold set with another mold set according to one form of the present disclosure is shown in FIG. 2A and an exploded view of FIG. 2A is shown in FIG. 2B. The mold locking assembly 20 includes a catch plate 200, a base plate 210, and a latch arm 220. The catch plate 200 includes a catch surface 202 and may or may not include a chamfer surface 204 that can cooperate with another chamfer surface 222 on the latch arm 220 as described below. In some variations, the catch plate 200 includes one or more apertures 206 that allow or provide one or more threaded fasteners 208 to extend therethrough such that the catch plate 200 can be rigidly attached to a mold (e.g., mold 135) via the one or more threaded fasteners 208. Accordingly, the catch plate 200 is configured to be rigidly attached to a mold.

The base plate 210 is configured to be rigidly attached to another mold. For example, in some variations the base plate 210 includes one or more apertures 212 that allow or provide one or more threaded fasteners 214 to extend therethrough such that the base plate 210 can be rigidly attached to a mold (e.g., mold 137) via the one or more threaded fasteners 214. And while FIGS. 2A-2B illustrate the catch plate 200 and the base plate 210 rigidly attached to the molds 135, 137, respectively, using the threaded fasteners 208, 214, respectively, in some variations, the catch plate 200 and/or the base plate 210 are rigidly attached to a respective mold with a different attachment or bonding technique, e.g., via welding, among others.

The base plate 210 also includes a pivot axis 'A' for the latch arm 220 to pivot about. For example, in some variations, the base plate 210 includes one or more posts 216 extending from a base member 215 and the one or more post 216 include an aperture 217 extending therethrough. And in such variations, a threaded fastener 218 (also referred to herein as a "pivot shaft") can be coaxial with the pivot axis A and extend parallel to the base member 215, pivotally attach the latch arm 220 to the base plate 210, and the latch arm 220 can pivot about the pivot axis 'A' of the base plate 210.

The latch arm 220 includes an elongated portion 224 extending between a proximal end 223 and a distal end 225. The elongated portion 224 has a length dimension that is greater than a width dimension (y-direction shown in FIGS. 2A-2B) and/or a thickness dimension (generally the z-direction shown in FIGS. 2A-2B) of the latch arm 220. An aperture 228 extending transversely (y-direction) through the elongated portion 224 can be included and the threaded fastener 218 or an unthreaded shaft or pin (not shown) can cooperate with the aperture 228 and the one or more apertures 217 extending through the one or more posts 216 to pivotally attach the latch arm 220 to the base plate 210. In some variations, the latch arm 220 is an L-shaped latch arm with a head 226 extending from the elongated portion 224 as illustrated in the figures. And in such variations, the head 226 can include the chamfer surface 222 that assists in the distal end 225 of the latch arm 220 sliding over the catch plate 200 as the molds 135 and 137 are moved towards and adjacent to each other (+/−x-directions) and a headed aperture 226a that accepts and threadingly engages a set screw 226b. For example, in variations where the catch plate includes the chamfer surface 204, and when the molds 135 and 137 move towards each other and into a closed position, the chamfer surface 222 of the latch arm 220 comes into contact with and slides over the chamfer surface 204 of the catch plate 200 as the latch arm 220 pivots upwardly (+Z direction). And as the molds 135 and 137 continue to move closer to each other, a catch surface 229 of the latch arm 220 moves beyond or past (−z direction) the catch surface 202, the latch arm 220 pivots downwardly (−z direction), and the catch surface 229 engages the catch surface 202 of the catch plate 200 such that the mold locking assembly 20 is in a locked position and the molds 135, 137 are securely locked to each other. In addition, the set screw 226b can be screwed into the threaded aperture 226a and engage the catch surface 202 such that the latch arm 220 is securely held or positioned in the locked position.

Still referring to FIGS. 2A-2B, in some variations the mold locking assembly 20 includes an actuator 230, e.g., a pneumatic actuator or a hydraulic actuator, among others, with a fluid (e.g., air) supply line 236. And in such variations, the actuator 230 can be rigidly attached to the base plate 210. For example, in at least one variation the mold locking assembly 20 includes an actuator mounting plate 240 with one or more apertures 242 and an actuator access aperture 245. The one or more apertures 242 provide for one or more threaded fasteners 244 to extend therethrough and rigidly attach the actuator mounting plate 240 to the one or more posts 216 by engaging with threaded apertures 219. That is, the threaded fasteners 244 screw into the threaded apertures 219 such that the actuator mounting plate 240 is securely mounted to the posts 216. In addition, the actuator 230 can include one or more apertures 232 that allow for one or more threaded fasteners 234 to engage one or more threaded apertures 246 in the actuator mounting plate 240 such that the actuator 230 is rigidly attached thereto. Accordingly, the actuator 230 can be rigidly attached to the base plate 210 through or by the rigid attachment of the actuator mounting plate 240 to the base plate 210 as illustrated in FIG. 2A. In addition, the proximal end 223 can be proximal to an inward facing (−z direction) surface of the actuator mounting plate 240 and the actuator 230 can be rigidly attached to an outward facing (+2 direction) surface of the actuator mounting plate 240. And in some variations, the actuator mounting plate 240 includes a latch arm slot 248 that allows or provides additional pivoting movement of the latch arm 220 in the upward direction (+z direction) shown in FIGS. 2A-2B.

Figure 3A:
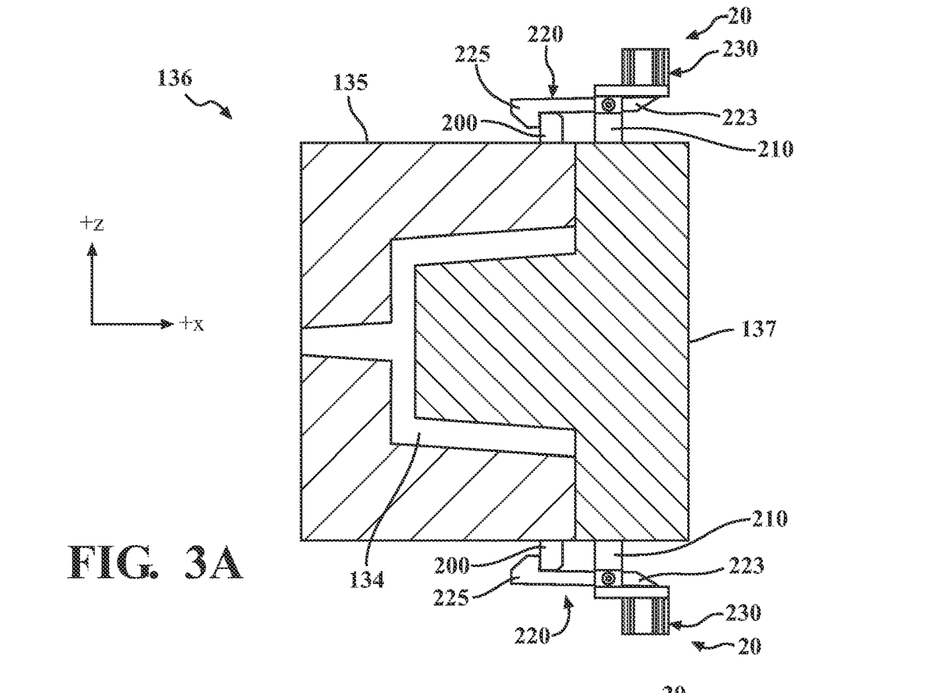
FIG. 3A shows a first mold set with the mold locking assembly in FIG. 2A in a locked position such that the first mold set is locked together according to the teachings of the present disclosure.

Referring to FIGS. 1A-1B and 3A-3F, illustration of the mold locking assembly 20 during operation of the injection molding machine 10 is shown. Particularly, FIG. 3A illustrates the mold set 136 with molds 135, 137 before installation and/or during installation into the injection molding machine 10 (injection molding machine 10 not shown in FIGS. 3A-3F). The molds 135, 137 are locked together with a pair of mold locking assemblies 20 in the locked position such that the distal end 225 of the latch arm 220 is engaged with the catch plate 200, i.e., the catch surface 229 is engaged with the catch surface 202 (FIG. 2B). In some variations, the set screw 226b, in cooperation with the threaded aperture 226a (FIG. 2B), is engaged with the catch surface 202 of the catch plate 200 such that the latch arm 220 is secured in the locked position. Accordingly, the molds 135, 137 are securely locked to each other such that the mold set 136 can be securely installed into the injection molding machine 10 in a time efficient manner. In addition, and with the mold locking assemblies 20 positioned on outer surfaces of the molds 135, 137, whether or not the mold locking assemblies 20 are in the locked position can be visually (and easily) determined by an operator/individual before and/or during installation of the mold set 136.

Figure 3B:
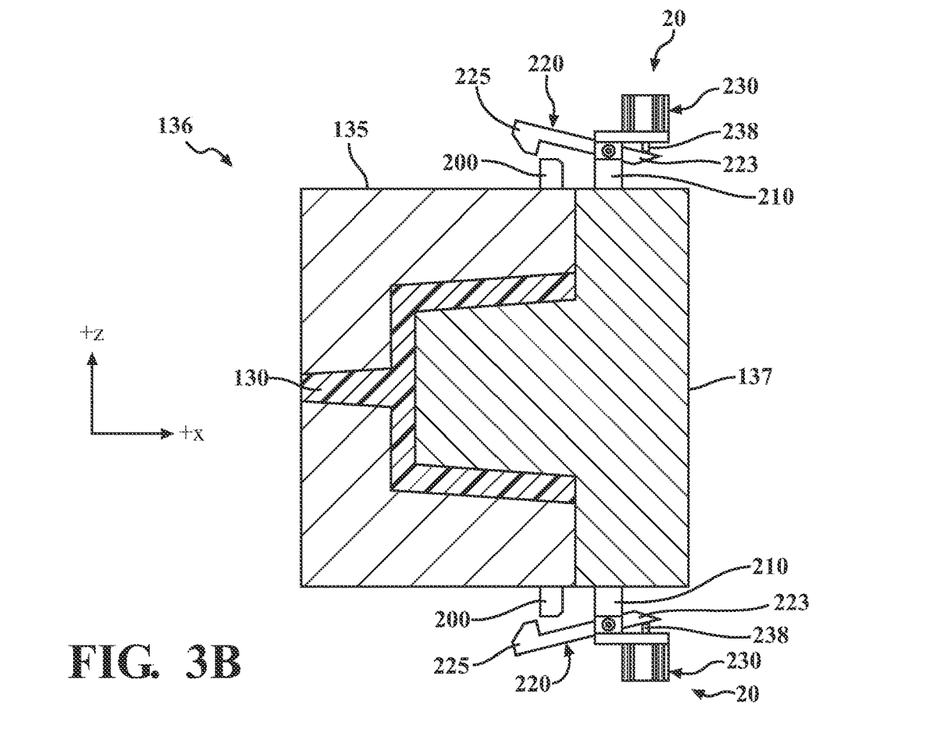
FIG. 3B shows the first mold set in FIG. 3A with the mold locking assembly in an unlocked position during injection molding of a part.

Referring particularly to FIG. 3B, the mold set 136 is installed in the injection molding machine 10, the pair of mold locking assemblies 20 are in the unlocked position, and molten thermoplastic material 130 is or has been injected into the mold cavity 134 while the molds 135, 137 are held together with pressure from the press or clamping unit 140. For example, and in variations where the mold locking assemblies 20 include the actuator 230, the actuator 230 includes an actuating piston 238 that extends through the actuator access aperture 245 and engages the proximal end 223 of the latch arm 220 such that the latch arm 220 pivots about the A axis of the base plate 210 (FIG. 2B) and the latch arm 220 disengages from the catch plate 200. And in variations where the mold locking assemblies 20 include the threaded aperture 226a and set screw 226b, the set screw 226b is disengaged from the catch surfaces 202 before actuating the actuator 230 and pivoting the latch arm 220 about the A axis.

Figure 3C:
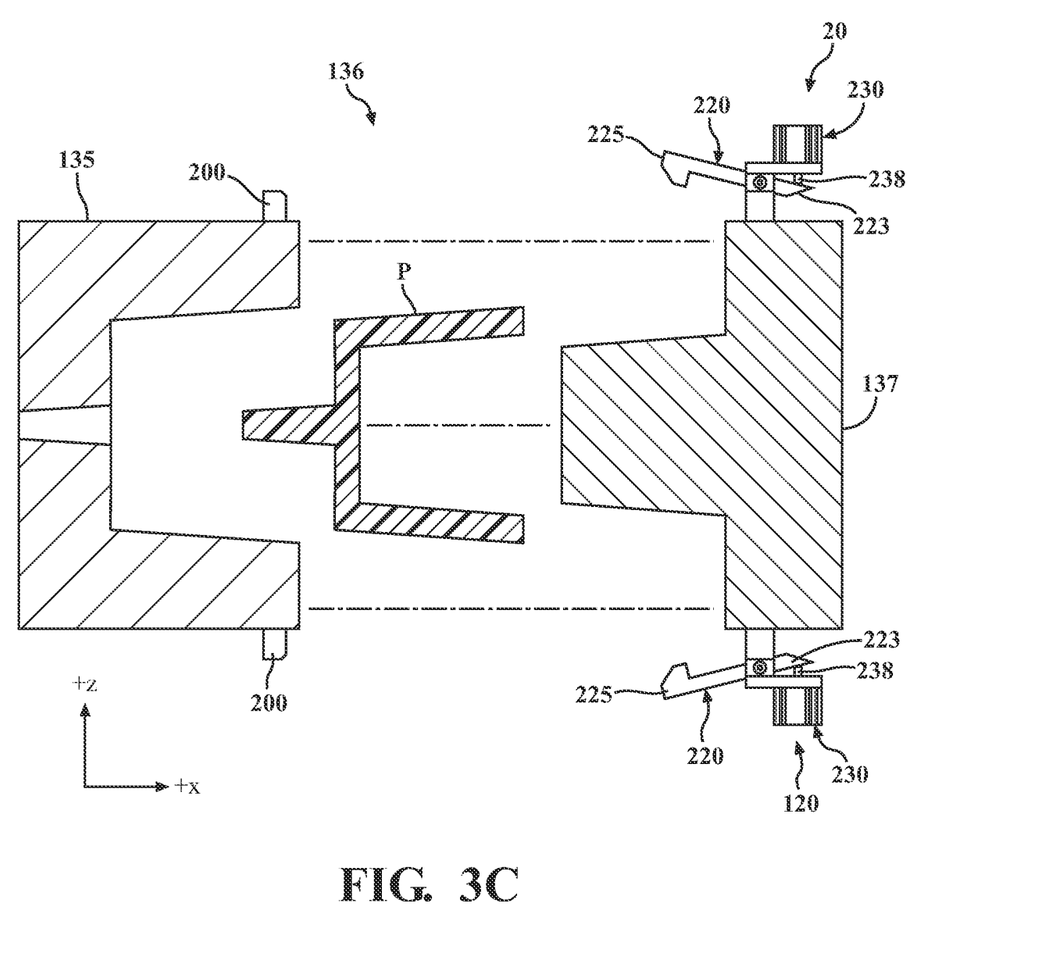
FIG. 3C shows the first mold set in FIG. 3B with the mold locking assembly in an unlocked position during ejection of the part in FIG. 3B.

Referring particularly to FIG. 3C, the pair of mold locking assemblies 20 are in the unlocked position, the molds 135, 137 are spatially separated from each other, and a part 'P'
formed from and by solidification of the molten thermoplastic material 130 is being ejected from the mold set 136 and the injection molding machine 10.

It should be understood that the molds 135, 137 are subsequently moved back into the position shown in FIG. 3B and another part P is formed by injection of additional molten thermoplastic material 130 into the mold cavity 134, cooling, and ejection from the mold set 136 (FIG. 3C). It should also be understood that this cycle (i.e., FIG. 3B—FIG. 3C—FIG. 3B) continues until a desired number of parts P are injection molded and formed, i.e., until the given production run is complete. Then, the molds 135, 137 are locked together (FIG. 3A) and removed from the injection molding machine 10. Accordingly, the mold locking assemblies 20 provide for secure and easily verifiable locking of the molds 135, 137 to each other before installation, during installation, and during removal of the mold set 136 from the injection molding machine 10.

Figure 3D:
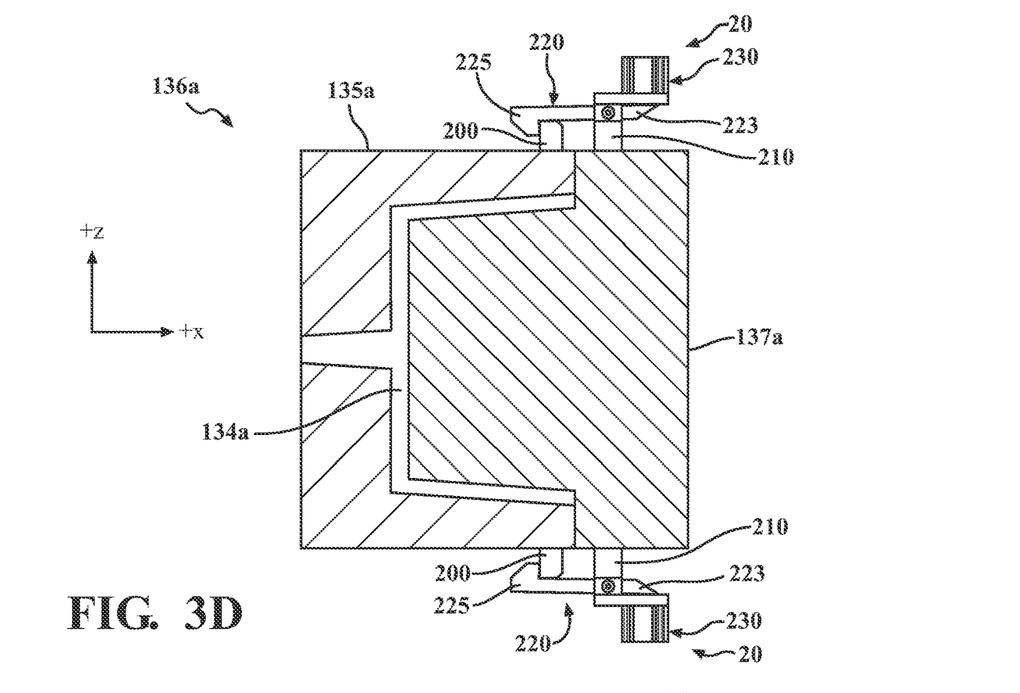
FIG. 3D shows a second mold set with the mold locking assembly in FIG. 2 in a locked position such that the second mold set is locked together according to the teachings of the present disclosure.

Referring particularly to FIG. 3D, another mold set 136a with molds 135a, 137a is locked together with another pair of mold locking assemblies 20 in preparation for replacement of or exchange with the mold set 136. In some variations, the set screw 226b, in cooperation with the threaded aperture 226a (FIG. 2B), is engaged with the catch surface 202 of the catch plate 200 such that the latch arm 220 is secured in the locked position. And after the mold set 136 is removed from the injection molding machine 10, the mold set 136a is installed.

Figure 3E:
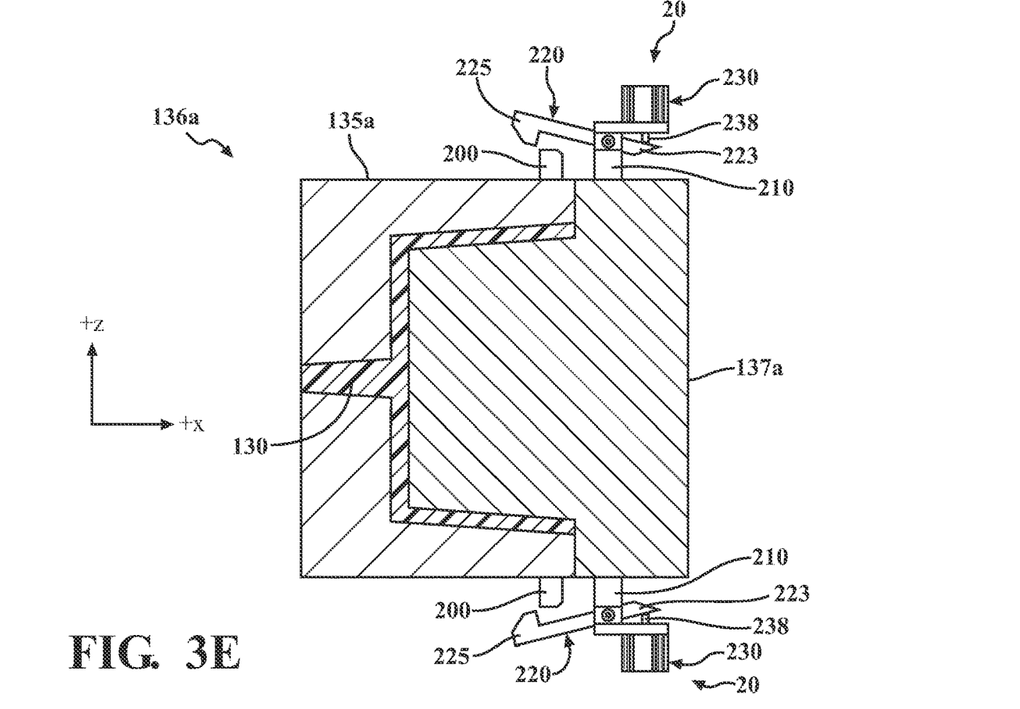
FIG. 3E shows the second mold set in FIG. 3D with the mold locking assembly in an unlocked position during injection molding of another part.

Referring particularly to FIG. 3E, the mold set 136a is installed in the injection molding machine 10, the pair of mold locking assemblies 20 are in the unlocked position, and molten thermoplastic material 130 is or has been injected into the mold cavity 134a while the molds 135a, 137a are held together with pressure from the press or clamping unit 140. For example, and in variations where the mold locking assemblies include the actuator 230, the actuator 230 includes an actuating piston 238 that engages the proximal end 223 of the latch arm 220 such that the latch arm 220 pivots about the A axis of the base plate 210 (FIG. 2B) and the latch arm 220 disengages from the catch plate 200. And in variations where the mold locking assemblies 20 include the threaded aperture 226a and set screw 226b, the set screw 226b is disengaged from the catch surfaces 202 before actuating the actuator 230 and pivoting the latch arm 220 about the A axis.

Figure 3F:
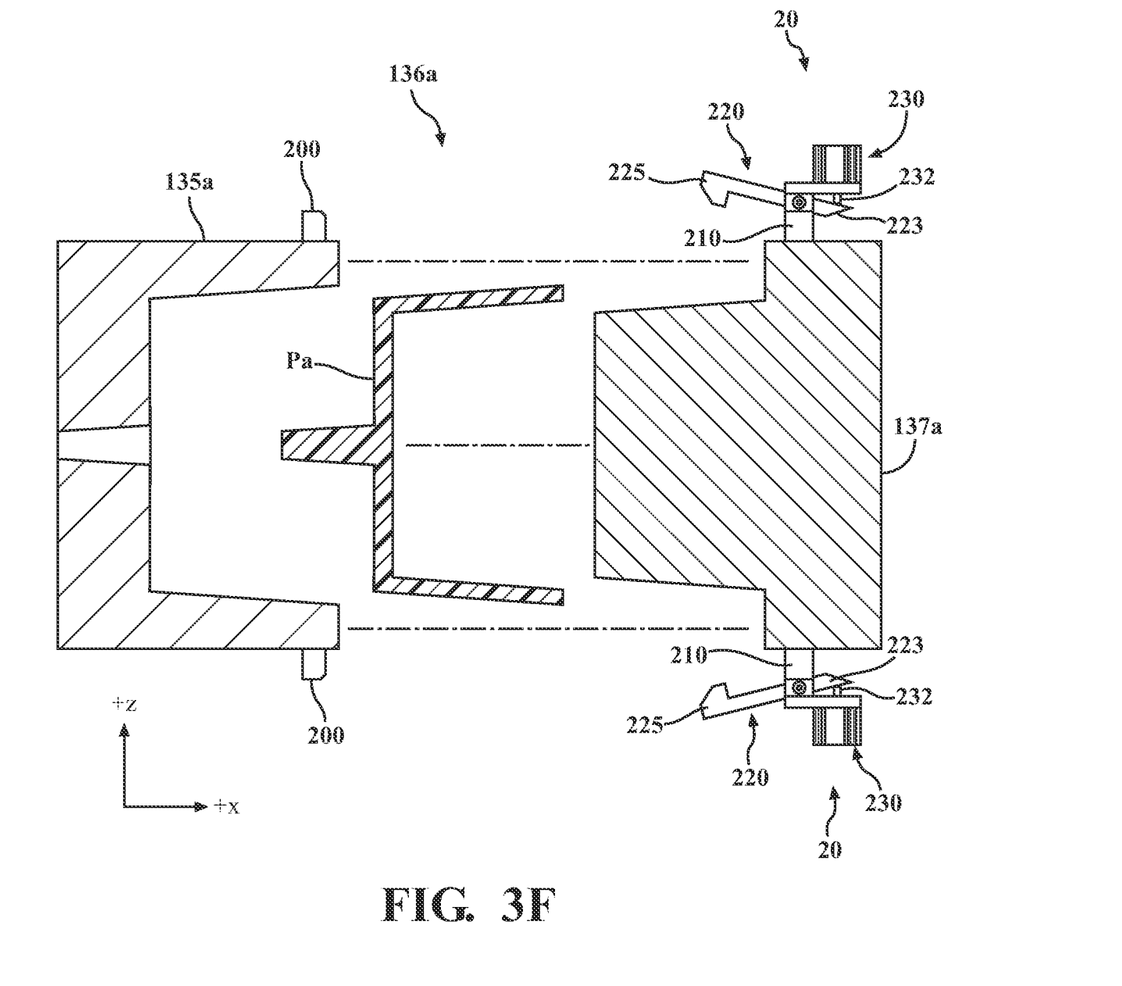
FIG. 3F shows the second mold set in FIG. 3E with the mold locking assembly in an unlocked position during ejection of the part in FIG. 3E.

Referring particularly to FIG. 3F, the pair of mold locking assemblies 20 are in the unlocked position, the molds 135a, 137a are spatially separated from each other, and another part 'Pa' formed from and by solidification of the molten thermoplastic material 130 is being ejected from the mold set 136a and the injection molding machine 10.

It should be understood that the molds 135a, 137a are subsequently moved back into the position shown in FIG. 3E and another part Pa is formed by injection of additional molten thermoplastic material 130 into the mold cavity 134a, cooling, and ejection from the mold set 136a (FIG. 3F). It should also be understood that this cycle (i.e., FIG. 3E-FIG. 3F-FIG. 3E) continues until a desired number of parts Pa are injection molded and formed, i.e., until the given production run is complete. Then, the molds 135a, 137a are locked together (FIG. 3D) and removed from the injection molding machine 10 such that the mold set 136 and/or still another mold set can be installed in the injection molding machine 10 and another production run can begin.

Figure 4:
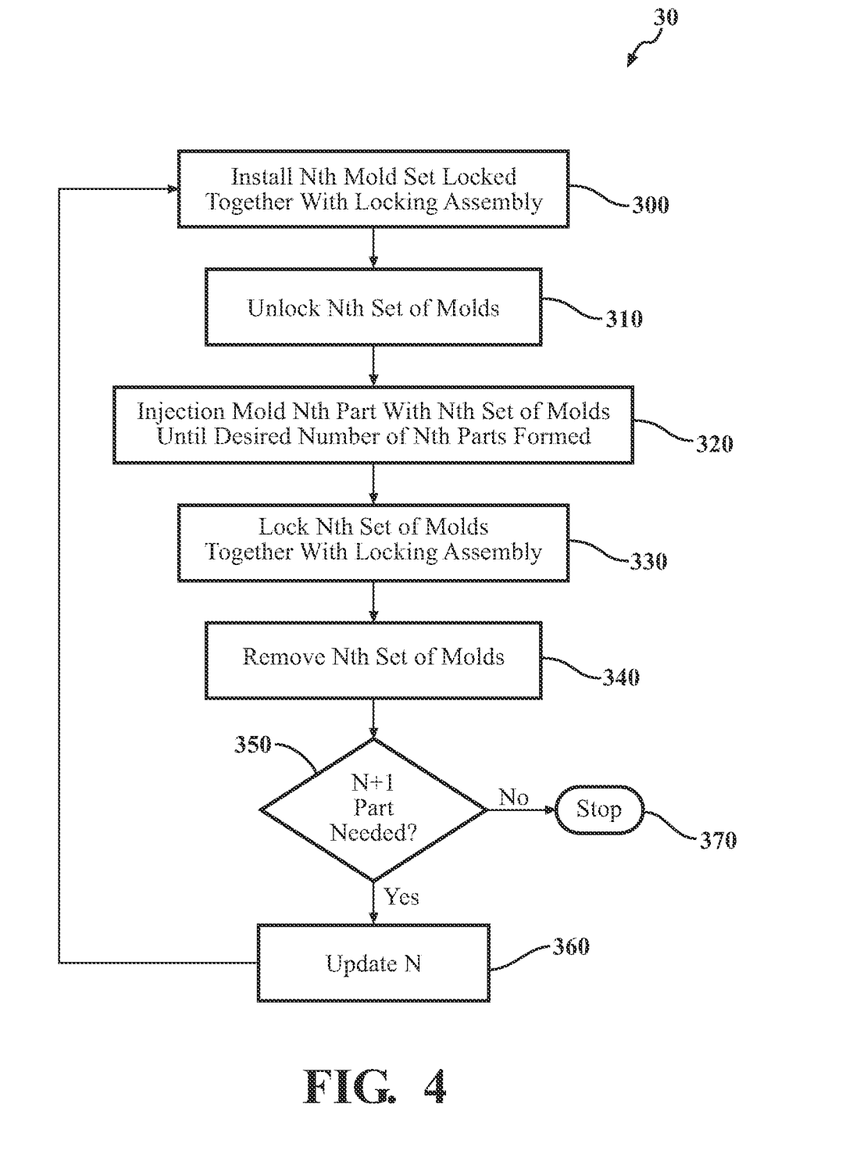
FIG. 4 shows a flow chart for a method of changing mold sets of an injection molding machine according to the teachings of the present disclosure.

Referring now to FIG. 4, a flow chart for a method 30 for manufacturing different or distinct parts (i.e., parts having different shapes) using an injection molding machine with the mold locking assemblies according to the teachings of the present disclosure is shown. The method 30 includes installing an Nth mold set (e.g., a first mold set, i.e., N=1) in the injection molding machine at 300. The Nth mold set includes at least two molds locked together during installation using two or more mold locking assemblies as described above. After the Nth mold set is installed in the injection molding machine, the two or more mold locking assemblies are unlocked at 310, i.e., the two mold locking assemblies are placed in the unlocked position such that the at least two molds are operable to move towards and away from each other as dictated or commanded by the injection molding machine. The method 30 proceeds to 320 where the injection molding machine manufactures a desired number of parts having a shape complimentary with a mold cavity between the at least two or molds, i.e., a production run is completed, and then the two or more molds of the Nth mold set are locked together using the two or more mold locking assemblies at 330. The Nth mold set is removed from the injection molding machine at 340, and the method 30 determines whether or not another production run for a different part using the same injection molding machine is desired at 350. If another production run is desired, the method 30 updates N (e.g., N is updated from 1 to 2) and returns to 300 to install an Nth mold set (e.g., where N=2), unlock the Nth mold set at 310, execute and complete the production run at 330, and removes the Nth mold set at 340. This cycle (i.e., 300-310-320-330-340-350-300) continues until another production run is not desired, and the method stops at 370.

The preceding description is merely illustrative in nature and is in no way intended to limit the disclosure, its application, or its uses. Work of the presently named inventors, to the extent it may be described in the background section, as well as aspects of the description that may not otherwise qualify as prior art at the time of filing, are neither expressly nor impliedly admitted as prior art against the present technology.

The block diagram in the figures illustrates the architecture, functionality, and operation of possible implementations of systems, methods, and computer program products according to various embodiments. In this regard, each block in the block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, devices, processes, and/or controllers described above can be realized in hardware or a combination of hardware and software and can be realized in a centralized fashion in one processing system or in a distributed fashion where different elements are spread across several interconnected processing systems. Any kind of processing system or another apparatus adapted for conducting the methods described herein is suited. A typical combination of hardware and software can be a processing system with computer-usable program code that, when being loaded and executed, controls the processing system such that it conducts the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to conduct these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should also be understood that the various method steps discussed herein do not have to be conducted in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A mold locking assembly comprising:
   a mold assembly for injection molding a part, the mold assembly comprising a first mold and a second mold adjacent to the first mold;
   a catch plate rigidly attached to the first mold;
   a base plate rigidly attached to the second mold; and
   an L-shaped latch arm pivotally attached to the base plate such that the L-shaped latch arm engages the catch plate and holds the first mold adjacent to the second mold;
   an actuator mounting plate, with an actuator access aperture, rigidly attached to the base plate; and
   a pneumatic actuator, with an actuator piston, rigidly attached to the actuator mounting plate and configured to engage and move the L-shaped latch arm between a locked position and an unlocked position.

2. The mold locking assembly assembling according to claim 1, wherein the L-shaped latch arm in the locked position engages the catch plate.

3. The mold locking assembly according to claim 2, wherein the pneumatic actuator engages a proximal end of the L-shaped latch arm to pivot the L-shaped latch arm from the locked position to the unlocked position.

4. The mold locking assembly according to claim 3, wherein the actuating piston extends through the actuator access aperture and engages the proximal end of the L-shaped latch arm.

5. The mold locking assembly according to claim 4, wherein the base plate comprises a pair of posts spaced apart from each other and the L-shaped latch arm is disposed between the pair of posts.

6. The mold locking assembly according to claim 5, wherein a pivot axis extends between the pair of posts and the L-shaped latch arm is pivotable about the pivot axis.

7. The mold locking assembly according to claim 6, wherein the pair of posts extend from and in a normal direction to a base member of the base plate.

8. The mold locking assembly according to claim 7, wherein the pivot axis extends parallel to the base member of the base plate.

9. The mold locking assembly according to claim 8 further comprising a pivot shaft extending between the pair of posts, coaxial with the pivot axis, and through the L-shaped latch arm such that the L-shaped latch arm is pivotable about the pivot shaft.

10. The mold locking assembly according to claim 9, wherein the actuator mounting plate is rigidly attached to the pair of posts extending from the base member of the base plate.

11. The mold locking assembly according to claim 10, wherein the actuator mounting plate is spaced apart from an outward facing surface of the base plate.

12. The mold locking assembly according to claim 11, wherein the proximal end of the L-shaped latch arm is proximal to an inward facing surface of the actuator mounting plate and the pneumatic actuator is rigidly attached to an outward facing surface of the actuator mounting plate.

13. A mold locking assembly comprising:
   a mold assembly for injection molding a part, the mold assembly comprising a first mold and a second mold adjacent to the first mold;
   a catch plate rigidly attached to the first mold;
   a base plate rigidly attached to the second mold, the base plate comprising a pair of posts spaced apart from each other and extending from and in a normal direction to an outward facing surface of the base plate;
   an L-shaped latch arm pivotally attached to the base plate such that the L-shaped latch arm engages the catch plate and holds the first mold adjacent to the second mold;
   an actuator mounting plate, with an actuator access aperture, rigidly attached to the base plate; and
   a pneumatic actuator with an actuator piston, the pneumatic actuator rigidly attached to the actuator mounting plate and configured to engage and move the L-shaped latch arm between a locked position and an unlocked position.

14. The mold locking assembly assembling according to claim 13, wherein the actuator piston of the pneumatic actuator extends through the actuator access aperture and engages a proximal end of the L-shaped latch arm.

15. The mold locking assembly according to claim 14 further comprising a pivot shaft extending between the pair of posts and through the L-shaped latch arm, wherein the L-shaped latch arm is pivotable about the pivot shaft between the locked position and the unlocked position.

16. A mold locking assembly comprising:
   a mold assembly for injection molding a part, the mold assembly comprising a first mold and a second mold adjacent to the first mold;

a catch plate rigidly attached to the first mold;

a base plate rigidly attached to the second mold, the base plate comprising a pair of posts spaced apart from each other and extending from and in a normal direction to an outward facing surface of the base plate;

an L-shaped latch arm pivotally attached to the pair of posts such that the L-shaped latch arm engages the catch plate and holds the first mold adjacent to the second mold;

an actuator mounting plate with an actuator access aperture, the actuator mounting plate rigidly attached to the pair of posts and spaced apart from the outward facing surface of the base plate; and a pneumatic actuator with an actuator piston, the pneumatic actuator rigidly attached to an outward facing surface of the actuator mounting plate and configured to engage and move the L-shaped latch arm between a locked position and an unlocked position, wherein the actuator piston extends through the actuator access aperture and engages a proximal end of the L-shaped latch arm.

17. The mold locking assembly according to claim 15, wherein the actuator mounting plate is rigidly attached to the pair of posts extending from the outward facing surface of the base plate.

18. The mold locking assembly according to claim 17, wherein the actuator mounting plate is spaced apart from an outward facing surface of the base plate.

19. The mold locking assembly according to claim 18, wherein the proximal end of the L-shaped latch arm is proximal to an inward facing surface of the actuator mounting plate and the pneumatic actuator is rigidly attached to an outward facing surface of the actuator mounting plate.

20. The mold locking assembly according to claim 13 further comprising a pivot shaft extending between the pair of posts such that the L-shaped latch arm is pivotable about the pivot shaft.

\* \* \* \* \*